(12) United States Patent
Hsu et al.

(10) Patent No.: US 8,542,507 B2
(45) Date of Patent: Sep. 24, 2013

(54) ADAPTIVE SYNCHRONOUS RECTIFICATION CONTROL METHOD AND APPARATUS

(75) Inventors: Jhih-Da Hsu, Taipei County (TW); Chia-Yo Yeh, Changhua County (TW); Chou-Sheng Wang, Keelung (TW); Ying-Chieh Su, Taipei County (TW); Rui-Hong Lu, Chiayi County (TW)

(73) Assignee: System General Corp., Taipei Hsien (TW)

( * ) Notice: Subject to any disclaimer, the term of this patent is extended or adjusted under 35 U.S.C. 154(b) by 366 days.

(21) Appl. No.: 13/069,534

(22) Filed: Mar. 23, 2011

(65) Prior Publication Data

US 2011/0305055 A1    Dec. 15, 2011

Related U.S. Application Data

(60) Provisional application No. 61/353,781, filed on Jun. 11, 2010.

(51) Int. Cl.
*H02H 7/125*    (2006.01)
*H02M 3/335*    (2006.01)

(52) U.S. Cl.
USPC ............................ 363/53; 363/21.14; 323/284

(58) Field of Classification Search
USPC .............. 363/21.06, 21.14, 50, 52, 53, 127; 323/265, 282, 284
See application file for complete search history.

(56) References Cited

U.S. PATENT DOCUMENTS

| | | | | |
|---|---|---|---|---|
| 7,868,602 B2* | 1/2011 | Omi et al. | | 323/284 |
| 7,928,715 B2* | 4/2011 | Shibata | | 323/288 |
| 8,040,120 B2* | 10/2011 | Ito et al. | | 323/285 |
| 8,040,698 B2* | 10/2011 | Hyuugaji | | 363/21.14 |

* cited by examiner

*Primary Examiner* — Gary L Laxton
(74) *Attorney, Agent, or Firm* — Rosenberg, Klein & Lee

(57) ABSTRACT

An adaptive synchronous rectification control circuit and a control method are developed. The control circuit comprises an adaptive circuit that generates a reference signal in response to a detection signal of a power converter. A clamped circuit clamps the reference signal at a threshold voltage if the reference signal equals or is greater than the threshold voltage. A switching circuit generates a control signal to control a synchronous switch of the power converter in response to the detection signal and the reference signal. The control method generates the reference signal in response to the detection signal. The reference signal is clamped at the threshold voltage if the reference signal equals or is greater than the threshold voltage. The method further generates the control signal to control the synchronous switch of the power converter in response to the detection signal and the reference signal.

15 Claims, 6 Drawing Sheets

US 8,542,507 B2

ADAPTIVE SYNCHRONOUS RECTIFICATION CONTROL METHOD AND APPARATUS

REFERENCE TO RELATED APPLICATION

This Application is being filed based on Provisional Patent Application Ser. No. 61/353,781 filed 11 Jun. 2010, currently pending.

BACKGROUND OF THE INVENTION

1. Filed of Invention

The present invention relates to a synchronous rectification control, more particularly; relates to an adaptive synchronous rectification control at the secondary side of a transformer for improving efficiency and accuracy.

2. Description of Related Art

An offline power converter includes a power transformer to provide isolation from an AC line voltage to the output of the power converter for safety. In recent development, applying a synchronous rectifier in the secondary side of the power transformer is to achieve a high efficiency conversion for power converters. FIG. 1 shows a conventional power converter with the synchronous rectifier. The conventional power converter comprises a bridge rectifier 10 and a bulk capacitor $C_{IN}$ for converting a power source $V_{AC}$ into an input voltage $V_{IN}$. The input voltage $V_{IN}$ is stored at the bulk capacitor $C_{IN}$. A power transformer $T_1$ comprises a primary winding $N_P$ in the primary side and a secondary winding $N_S$ in the secondary side. The primary side of the power transformer $T_1$ has a power switch Q1 coupled to the primary winding $N_P$ for switching the power transformer $T_1$ and for regulating an output voltage $V_O$ of the power converter. The power switch Q1 receives a drive signal $S_G$ and is coupled between the primary winding $N_P$ of the power transformer $T_1$ and a ground.

The secondary winding $N_S$ of the power transformer $T_1$ is coupled to the output of the power converter through a synchronous switch Q2 and an output capacitor $C_O$. A drain terminal of the synchronous switch Q2 is coupled to a terminal of the secondary winding $N_S$. A source terminal of the synchronous switch Q2 is coupled to the ground. The output capacitor $C_O$ is coupled between the other terminal of the secondary winding $N_S$ and the ground. The synchronous switch Q2 and its parasitic diode $D_{Q2}$ are operated as the synchronous rectifier. Thus, the synchronous switch Q2 having the parasitic diode $D_{Q2}$ is coupled between the secondary winding $N_S$ of the power transformer $T_1$ and the output capacitor $C_O$. The output capacitor $C_O$ is coupled to the output voltage $V_O$ of the power converter.

A control circuit 20 placed at the secondary side of the power transformer $T_1$ is coupled to a gate terminal of the synchronous switch Q2 for generating a control signal $S_W$ at an output terminal OUT of the control circuit 20 to turn on/off the synchronous switch Q2 in response to a detection signal $V_{DET}$ at a detection terminal VDET of the control circuit 20. The detection terminal VDET is coupled to the secondary winding $N_S$. The detection signal $V_{DET}$ is generated at a magnetized voltage $V_S$, a demagnetized voltage and a magnetized period of the power transformer $T_1$. The enabling period of the control signal $S_W$ is correlated to the demagnetized period of the power transformer $T_1$. The control circuit 20 includes a comparator 24 and a PWM circuit 25. A positive input of the comparator 24 receives the detection signal $V_{DET}$. A threshold signal $V_T$ is applied with a negative input of the comparator 24. An output of the comparator 24 generates a switching signal $S_{ON}$ by comparing the detection signal $V_{DET}$ with the threshold signal $V_T$. The PWM circuit 25 is coupled to the gate terminal of the synchronous switch Q2 for generating the control signal $S_W$ in response to the switching signal $S_{ON}$.

FIG. 2A shows the waveforms of the input voltage $V_{IN}$, the detection signal $V_{DET}$ and the switching signal $S_{ON}$. The input voltage $V_{IN}$ across the bulk capacitor $C_{IN}$ is rectified by the bridge rectifier 10 shown in FIG. 1. The bulk capacitor $C_{IN}$ is served as a voltage regulator, and a ripple range of the input voltage $V_{IN}$ is determined by the capacitance of the bulk capacitor $C_{IN}$. Thus, the detection signal $V_{DET}$ is changed in response to the ripple range of the input voltage $V_{IN}$ correspondingly. When the threshold signal $V_T$ is set too high, the switching signal $S_{ON}$ will be missed by comparing the detection signal $V_{DET}$ with the threshold signal $V_T$ for a valley voltage of the input voltage $V_{IN}$. Apparently, for example, the first two lower detection signals $V_{DET}$ are not detected since their amplitudes are lower than the threshold signal $V_T$. Hence, the first drawback of the prior art is that the switching signal $S_{ON}$ will be stopped some periods temporarily during the valley voltage of the input voltage $V_{IN}$ once the threshold signal $V_T$ is set too high.

FIG. 2B shows the waveforms of the detection signal $V_{DET}$, the switching signals $S_{ON1}$, $S_{ON2}$) and the drive signal $S_G$ disclosed in FIG. 1. FIG. 2B illustrates the detection signal $V_{DET}$ operated in DCM (Discontinuous Conduction Mode). During the normal operation, the switching signal $S_{ON}$ is generated in accordance with the comparison between the detection signal $V_{DET}$ and the threshold signal $V_T$. As shown in FIG. 2B, the switching signal $S_{ON}$ and the threshold signal $V_T$ can be regarded as a first switching signal $S_{ON1}$ and a first threshold signal $V_{T1}$ respectively. When the threshold signal $V_T$ is set too low, an undesirable pulse for the switching signal $S_{ON}$ is generated by comparing the detection signal $V_{DET}$ with the threshold signal $V_T$. As shown in FIG. 2B, the switching signal $S_{ON}$ and the threshold signal $V_T$ can be regarded as a second switching signal $S_{ON2}$ and a second threshold signal $V_{T2}$ respectively. The second threshold signal $V_{T2}$ is lower than the first threshold signal $V_{T1}$. Apparently, for example, the second switching signal $S_{ON2}$ has an additional pulse during a switching period. Hence, the second drawback of the prior art is that the additional pulse in the switching signal $S_{ON}$ will be generated for each switching period once the threshold signal $V_T$ is set too low.

SUMMARY OF THE INVENTION

In view of the disadvantages of prior arts, the main object of the present invention is to provide an apparatus and method for measuring the detection signal accurately by providing an adaptive synchronous rectification circuit.

An adaptive synchronous rectification control method is provided according to the present invention. The control method generates a reference signal in response to a detection signal of a power converter. The reference signal is clamped at a threshold voltage if the reference signal equals or is greater than the threshold voltage. The method further generates a control signal to control a synchronous switch of the power converter in response to the detection signal and the reference signal.

An adaptive synchronous rectification control circuit is provided according to the present invention. The control circuit comprises an adaptive circuit, a clamped circuit and a switching circuit. The adaptive circuit generates the reference signal in response to the detection signal of the power converter. The clamped circuit clamps the reference signal at the threshold voltage if the reference signal equals or is greater than the threshold voltage. The switching circuit generates the control signal to control the synchronous switch of the power converter in response to the detection signal and the reference signal.

BRIEF DESCRIPTION OF THE DRAWINGS

The invention can be more fully understood by reading the subsequent detailed description and examples with references made to the accompanying drawings, wherein.

DESCRIPTION OF THE EXEMPLARY EMBODIMENTS

Figure 1:
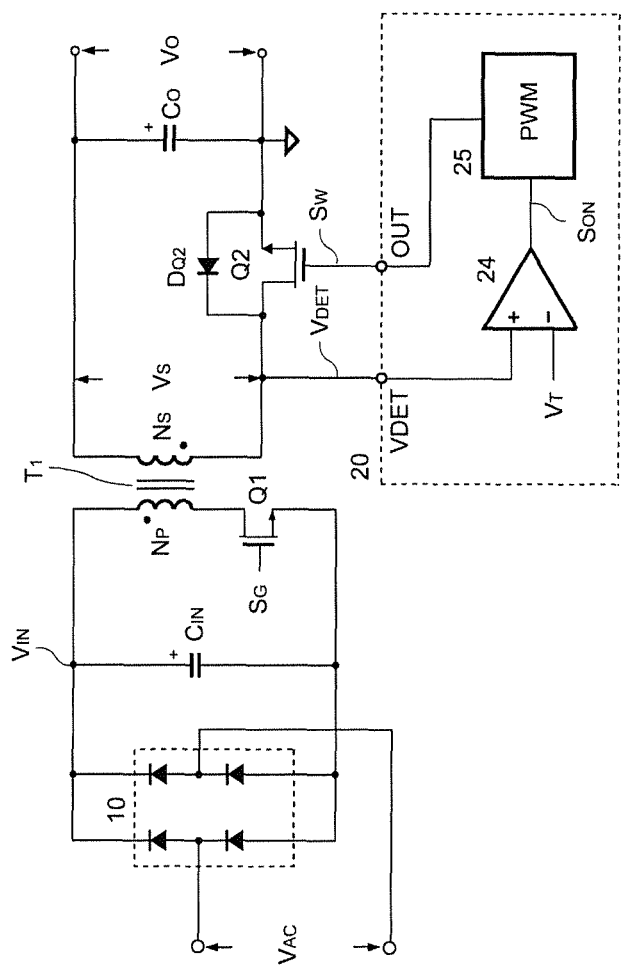
FIG. 1 shows a circuit diagram of a conventional power converter with a synchronous rectifier.
Figure 2A:
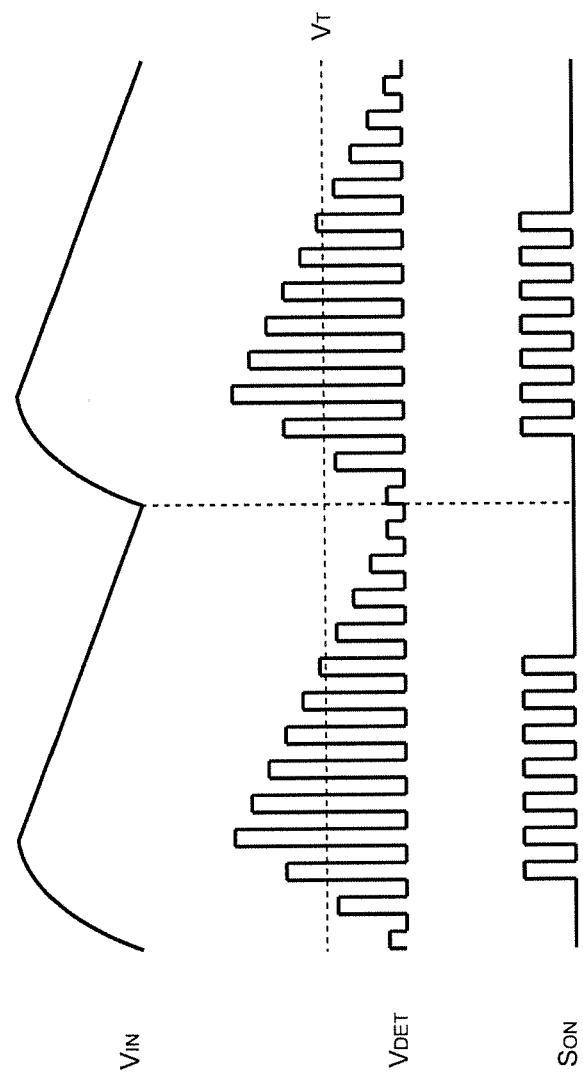
FIG. 2A shows the waveforms of the input voltage, the detection signal and the switching signal.
Figure 2B:
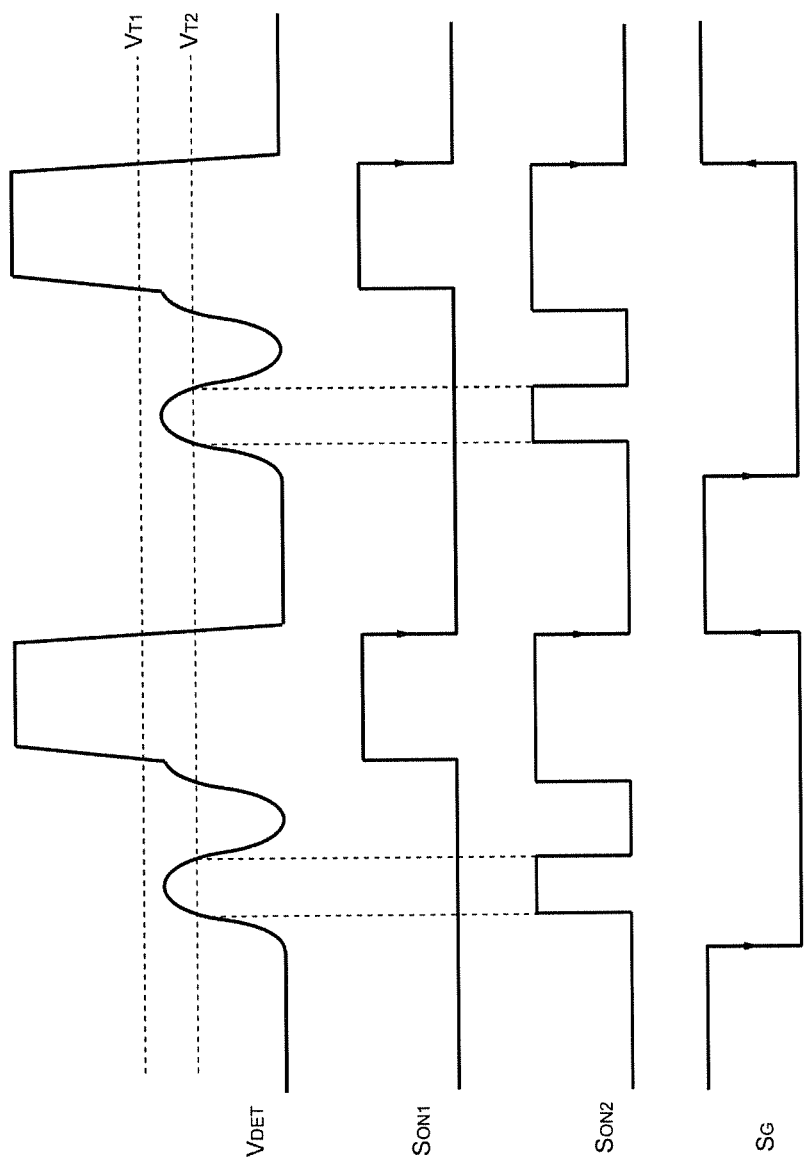
FIG. 2B shows the waveforms of the detection signal, the switching signals and the drive signal.
Figure 3:
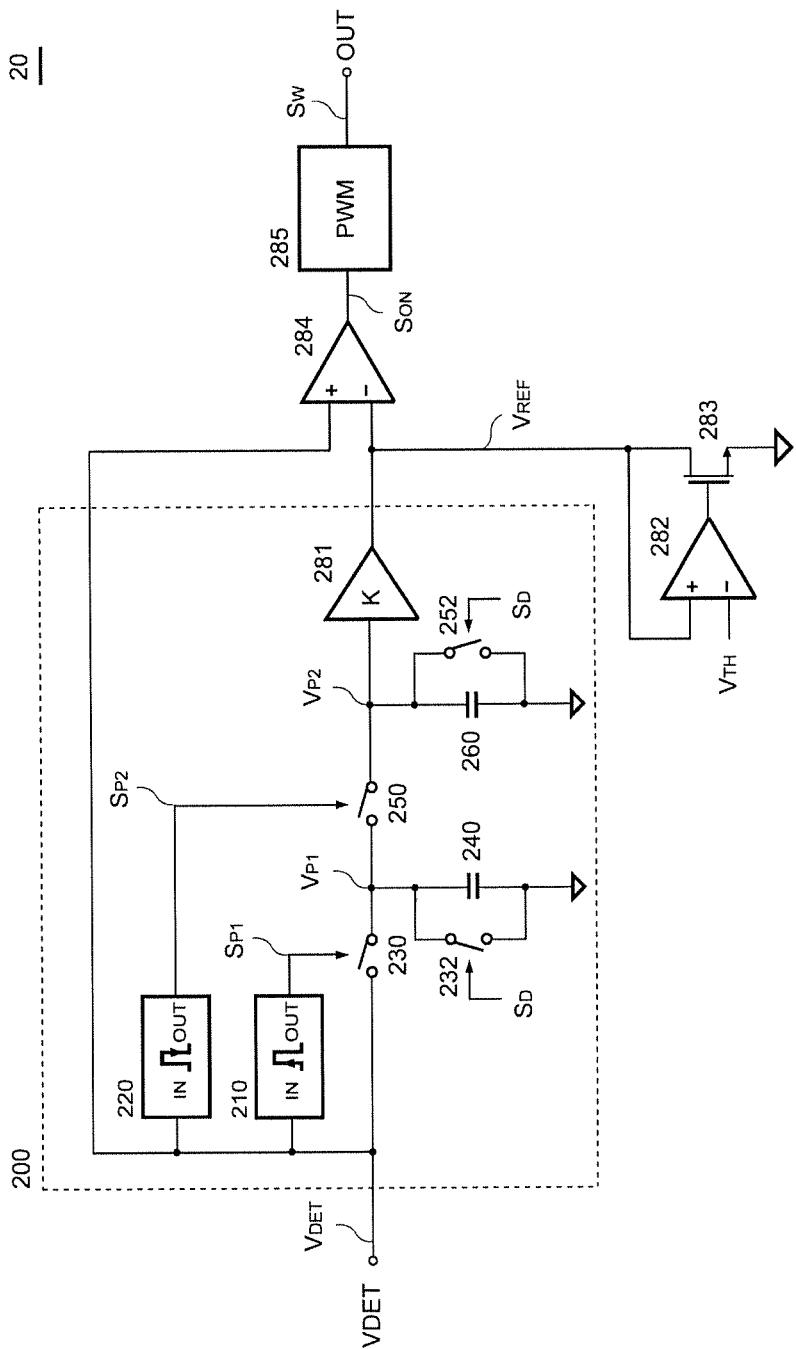
FIG. 3 shows a circuit diagram of a preferred embodiment of the control circuit according to the present invention.

FIG. 3 shows a preferred embodiment of the control circuit 20 according to the present invention. The control circuit 20 includes an adaptive circuit 200, a clamped circuit formed by an operational amplifier 282 and a transistor 283, and a switching circuit including a comparator 284 and a PWM circuit 285. The adaptive circuit 200 is used to generate a reference signal $V_{REF}$ in response to the detection signal $V_{DET}$ of the power converter. The detection signal $V_{DET}$ is correlated to the input voltage $V_{IN}$ (as shown in FIG. 1) of the power converter. The adaptive circuit 200 comprises a rising edge detector 210, a falling edge detector 220, a sample-hold circuit and an amplifier 281. The sample-hold circuit is used for sampling and holding the detection signal $V_{DET}$ for generating the reference signal $V_{REF}$. The sample-hold circuit is formed by a first sample switch 230, a first hold capacitor 240, a first discharge switch 232, a second sample switch 250, a second hold capacitor 260 and a second discharge switch 252. A terminal of the first sample switch 230 is coupled to the detection terminal VDET to receive the detection signal $V_{DET}$. The first hold capacitor 240 is coupled between the other terminal of the first sample switch 230 and the ground. The second sample switch 250 is coupled between the first hold capacitor 240 and the second hold capacitor 260. The second hold capacitor 260 is further coupled to the ground. The rising edge detector 210 receives the detection signal $V_{DET}$ for generating a first sample signal $S_{P1}$ during a rising edge of the detection signal $V_{DET}$. The falling edge detector 220 receives the detection signal $V_{DET}$ for generating a second sample signal $S_{P2}$ during a falling edge of the detection signal $V_{DET}$. The first sample signal $S_{P1}$ and the second sample signal $S_{P2}$ are utilized to control the sample-hold circuit to sample and hold the detection signal $V_{DET}$.

The first sample switch 230 is controlled by the first sample signal $S_{P1}$ of the rising edge detector 210. By switching the first sample switch 230 periodically, a first hold signal $V_{P1}$ is charged and generated at the first hold capacitor 240 in response to the detection signal $V_{DET}$. The second sample switch 250 is controlled by the second sample signal $S_{P2}$ of the falling edge detector 220. By switching the second sample switch 250 periodically, a second hold signal $V_{P2}$ is charged and generated at the second hold capacitor 260 in response to the first hold signal $V_{P1}$. The first discharge switch 232 is coupled to the first hold capacitor 240 in parallel. The second discharge switch 252 is also coupled to the second hold capacitor 260 in parallel. The first discharge switch 232 and the second discharge switch 252 are controlled by a discharge signal $S_D$ for discharging the hold capacitors 240 and 260. During a switching period, the discharge signal $S_D$ is placed at the end of the second sample signal $S_{P2}$ to clear and reset the first hold signal $V_{P1}$ of the first hold capacitor 240 and the second hold signal $V_{P2}$ of the second hold capacitor 260.

The amplifier 281 is coupled to the second hold capacitor 260 to receive the second hold signal $V_{P2}$. The amplifier 281 with an amplifier coefficient K generates the reference signal $V_{REF}$ in response to the second hold signal $V_{P2}$ and the amplifier coefficient K. The amplifier coefficient K must be smaller than 1. The second hold signal $V_{P2}$ can be generated by sampling and holding the detection signal $V_{DET}$. However, the reference signal $V_{REF}$ will be further limited by a threshold voltage $V_{TH}$ via the clamped circuit formed by the operational amplifier 282 and the transistor 283. Therefore, the second hold signal $V_{P2}$ multiplied by the amplifier coefficient K is smaller than the threshold voltage $V_{TH}$, or is clamped at the threshold voltage $V_{TH}$ if the second hold signal $V_{P2}$ multiplied by the amplifier coefficient K equals or is greater than the threshold voltage $V_{TH}$. That is, the reference signal $V_{REF}$ is smaller than the threshold voltage $V_{TH}$, or is clamped at the threshold voltage $V_{TH}$ if the reference signal $V_{REF}$ equals or is greater than the threshold voltage $V_{TH}$.

The threshold voltage $V_{TH}$ is supplied with a negative input of the operational amplifier 282. The operational amplifier 282 having a positive input is coupled to a drain terminal of the transistor 283 and an output of the k-time amplifier 281 of the adaptive circuit 200. An output of the operational amplifier 282 controls a gate terminal of the transistor 283. A source terminal of the transistor 283 is coupled to the ground. The transistor 283 is turned on by the operational amplifier 282 to clamp the reference signal $V_{REF}$ at the threshold voltage $V_{TH}$ if the reference signal $V_{REF}$ equals or is greater than the threshold voltage $V_{TH}$. In other words, during a switching period of the power converter, the reference signal $V_{REF}$ is generated by sampling and holding the detection signal $V_{DET}$ and then multiplying the amplifier coefficient K, and further limited by the threshold voltage $V_{TH}$.

The switching circuit including the comparator 284 and the PWM circuit 285 is used for generating the control signal $S_W$ to control the synchronous switch Q2 (as shown in FIG. 1) of the power converter in response to the detection signal $V_{DET}$ and the reference signal $V_{REF}$. A positive input of the comparator 284 receives the detection signal $V_{DET}$. A negative input of the comparator 284 is coupled to receive the reference signal $V_{REF}$. The comparator 284 generates the switching signal $S_{ON}$ by comparing the detection signal $V_{DET}$ with the reference signal $V_{REF}$. It must be noted that the detection signal $V_{DET}$ is generated by present switching period of the power converter, and the reference signal $V_{REF}$ is generated by sampling and holding the detection signal $V_{DET}$ generated by previous switching period of the power converter and then multiplying the amplifier coefficient K, and further limited by the threshold voltage $V_{TH}$. In other words, the switching signal $S_{ON}$ is generated by comparing the detection signal $V_{DET}$ generated by present switching period with the reference signal $V_{REF}$ generated by the detection signal $V_{DET}$ generated by previous switching period. Hence, the switching signal $S_{ON}$ is kept on-state once the detection signal $V_{DET}$ is greater than the reference signal $V_{REF}$. On the other hand, the switching signal $S_{ON}$ is kept off-state once the detection signal $V_{DET}$ is smaller than the reference signal $V_{REF}$.

The PWM circuit 285 generates the control signal $S_W$ at the output terminal OUT of the control circuit 20 for switching the synchronous switch Q2 in response to the switching signal $S_{ON}$. Because the switching signal $S_{ON}$ and the control signal $S_W$ are identical and in phase during a switching period, the switching signal $S_{ON}$ is correlated to the control signal $S_W$. The switching signal $S_{ON}$ is used for turning on the PWM circuit 285 to control the synchronous switch Q2. The PWM circuit 285 is a prior-art technique, so here is no detailed description about it.

Figure 4A:
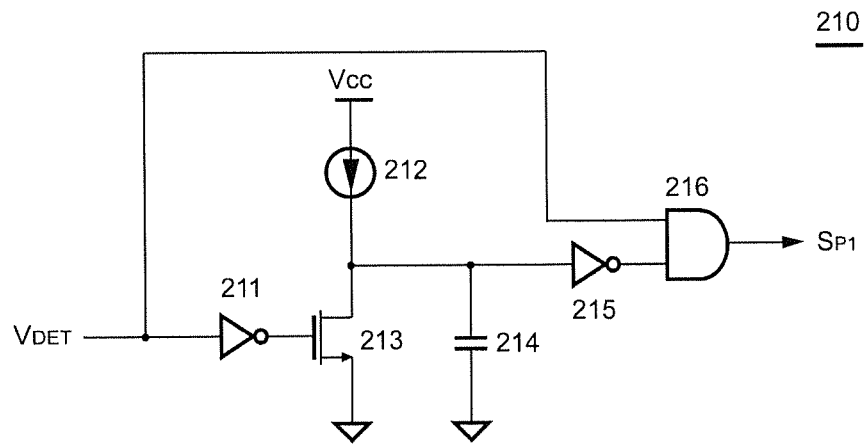
FIG. 4A shows a circuit diagram of a preferred embodiment of the rising edge detector according to the present invention.

FIG. 4A illustrates a circuit diagram of a preferred embodiment of the rising edge detector 210 according to the present invention. The rising edge detector 210 disclosed in FIG. 3 comprises a first inverter 211, a current source 212, a transistor 213, a capacitor 214, a second inverter 215 and an AND gate 216. The rising edge detector 210 receives the detection signal $V_{DET}$ for generating the first sample signal $S_{P1}$ during a rising edge of the detection signal $V_{DET}$. A gate terminal of the transistor 213 receives the detection signal $V_{DET}$ through the first inverter 211. The detection signal $V_{DET}$ is coupled to control the transistor 213 via the first inverter 211. The current source 212 is coupled between a voltage source $V_{CC}$ and a drain terminal of the transistor 213. A source terminal of the transistor 213 is coupled to the ground.

The capacitor 214 is connected between the drain terminal of the transistor 213 and the ground. The transistor 213 is coupled to the capacitor 214 in parallel to discharge the capacitor 214. The current source 212 is connected to the voltage source $V_{CC}$ and is used to charge the capacitor 214. The current source 212 and the capacitance of the capacitor 214 determine the pulse-width and the amplitude of the voltage across the capacitor 214. One input terminal of the AND gate 216 is coupled to the drain terminal of the transistor 213 and the capacitor 214 via the second inverter 215. The other input terminal of the AND gate 216 receives the detection signal $V_{DET}$. An output of the AND gate 216 is coupled to generate the first sample signal $S_{P1}$.

Figure 4B:
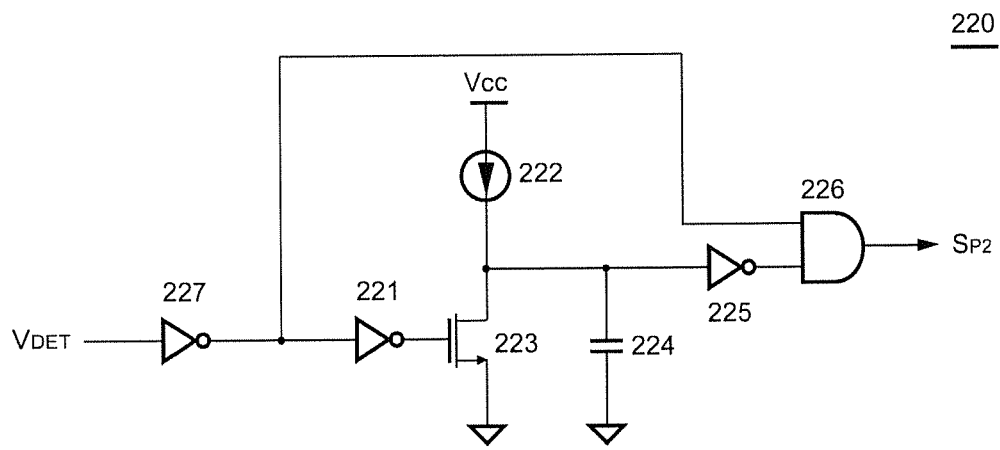
FIG. 4B shows a circuit diagram of a preferred embodiment of the falling edge detector according to the present invention.

FIG. 4B illustrates a circuit diagram of a preferred embodiment of the falling edge detector 220 according to the present invention. The falling edge detector 220 disclosed in FIG. 3 comprises a first inverter 221, a current source 222, a transistor 223, a capacitor 224, a second inverter 225, an AND gate 226 and a third inverter 227. The falling edge detector 220 receives the detection signal $V_{DET}$ for generating the second sample signal $S_{P2}$ during a falling edge of the detection signal $V_{DET}$. A gate terminal of the transistor 223 receives the detection signal $V_{DET}$ through the first inverter 221 and the third inverter 227. The first inverter 221 is coupled between the third inverter 227 and the gate terminal of the transistor 223. The detection signal $V_{DET}$ is coupled to control the transistor 223 via the first inverter 221 and the third inverter 227. The current source 222 is coupled between the voltage source $V_{CC}$ and a drain terminal of the transistor 223. A source terminal of the transistor 223 is coupled to the ground.

The capacitor 224 is connected between the drain terminal of the transistor 223 and the ground. The transistor 223 is coupled to the capacitor 224 in parallel to discharge the capacitor 224. The current source 222 is connected to the voltage source $V_{CC}$ and is used to charge the capacitor 224. The current source 222 and the capacitance of the capacitor 224 determine the pulse-width and the amplitude of the voltage across the capacitor 224. One input terminal of the AND gate 226 is coupled to the drain terminal of the transistor 223 and the capacitor 224 via the second inverter 225. The other input terminal of the AND gate 226 receives the detection signal $V_{DET}$ through the third inverter 227. An output of the AND gate 226 is coupled to generate the second sample signal $S_{P2}$.

Figure 5:
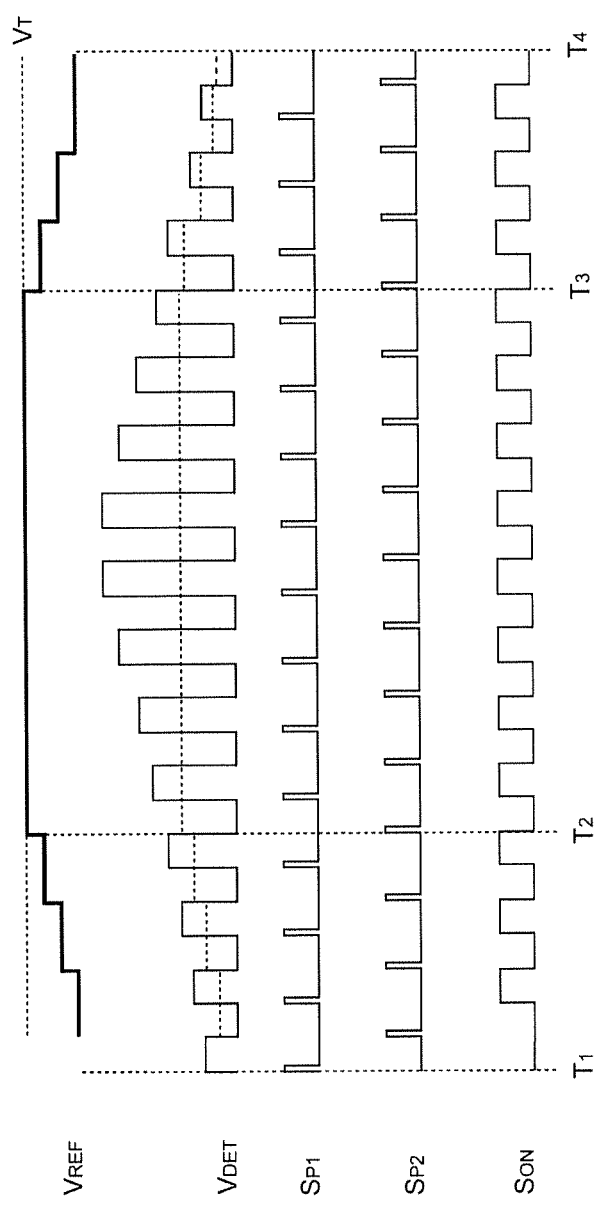
FIG. 5 shows the output waveforms of the reference signal, the detection signal, the first sample signal, the second sample signal and the switching signal according to the present invention.

FIG. 5 illustrates the output waveforms of the reference signal $V_{REF}$, the detection signal $V_{DET}$, the first sample signal $S_{P1}$, the second sample signal $S_{P2}$ and the switching signal $S_{ON}$ according to the present invention. As previously mentioned, the first sample signal $S_{P1}$ is a plurality of one-shot pulses corresponding to the rising edges of the detection signal $V_{DET}$, and the second sample signal $S_{P2}$ is a plurality of one-shot pulses corresponding to the falling edges of the detection signal $V_{DET}$. The first sample signal $S_{P1}$ is generated in accordance with the rising edge of the detection signal $V_{DET}$. The second sample signal $S_{P2}$ is generated in accordance with the falling edge of the detection signal $V_{DET}$.

As shown in the switching waveform of the switching signal $S_{ON}$, the switching signal $S_{ON}$ is generated by comparing the detection signal $V_{DET}$ generated by present switching period with the reference signal $V_{REF}$ generated by the detection signal $V_{DET}$ generated by previous switching period. The reference signal $V_{REF}$ is generated in response to the second hold signal $V_{P2}$ (as shown in FIG. 3) generated by sampling and holding the detection signal $V_{DET}$. However, the second hold signal $V_{P2}$ multiplied by the amplifier coefficient K will be further limited by the threshold voltage $V_{TH}$ shown as the doted line. Therefore, the reference signal $V_{REF}$ is smaller than the threshold voltage $V_{TH}$, or being clamped at the threshold voltage $V_{TH}$ if the reference signal $V_{REF}$ equals or is greater than the threshold voltage $V_{TH}$.

Between timing $T_1$ and timing $T_2$, the switching signal $S_{ON}$ is generated and the amplitude of the reference signal $V_{REF}$ is increased gradually in response to the increase of the input voltage $V_{IN}$ and the detection signal $V_{DET}$. What is noteworthy is, between timing $T_2$ and timing $T_3$, the switching signal $S_{ON}$ is generated and the amplitude of the reference signal $V_{REF}$ keeps a fixed value (shown as the threshold voltage $V_{TH}$) even though the input voltage $V_{IN}$ and the detection signal $V_{DET}$ are still raised. Between timing $T_3$ and timing $T_4$, the switching signal $S_{ON}$ is generated and the amplitude of the reference signal $V_{REF}$ is decreased gradually in response to the decrease of the input voltage $V_{IN}$ and the detection signal $V_{DET}$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adaptive synchronous rectification control circuit comprising:
   an adaptive circuit generating a reference signal in response to a detection signal of a power converter;
   a clamped circuit coupled to the adaptive circuit, in which the clamped circuit clamps the reference signal at a threshold voltage if the reference signal equals or is greater than the threshold voltage; and
   a switching circuit generating a control signal to control a synchronous switch of the power converter in response to the detection signal and the reference signal.

2. The control circuit as claimed in claim 1, wherein the adaptive circuit further comprises a sample-hold circuit for sampling and holding the detection signal for generating the reference signal.

3. The control circuit as claimed in claim 2, wherein the adaptive circuit further comprises an amplifier coupled to the sample-hold circuit, the sample-hold circuit samples and holds the detection signal to generate a hold signal, the amplifier receives the hold signal to generate the reference signal in response to the hold signal and an amplifier coefficient.

4. The control circuit as claimed in claim 2, wherein the adaptive circuit further comprises:
- a rising edge detector generating a first sample signal in accordance with a rising edge of the detection signal; and
- a falling edge detector generating a second sample signal in accordance with a falling edge of the detection signal;
- wherein the first sample signal and the second sample signal are utilized to control the sample-hold circuit to sample and hold the detection signal for generating the reference signal.

5. The control circuit as claimed in claim 1, wherein the clamped circuit comprises:
- a transistor coupled between the adaptive circuit and a ground; and
- an operational amplifier controlling the transistor in response to the reference signal and the threshold voltage;
- wherein the transistor is turned on by the operational amplifier to clamp the reference signal at the threshold voltage if the reference signal equals or is greater than the threshold voltage.

6. The control circuit as claimed in claim 1, wherein the switching circuit comprises;
- a comparator comparing the detection signal with the reference signal to generating a switching signal; and
- a PWM circuit generating the control signal in response to the switching signal.

7. The control circuit as claimed in claim 1, wherein the detection signal is generated by present switching period of the power converter, and the reference signal is generated by sampling and holding the detection signal generated by previous switching period of the power converter.

8. The control circuit as claimed in claim 1, wherein the detection signal is correlated to an input voltage of the power converter.

9. An adaptive synchronous rectification control method comprising:
- generating a reference signal in response to a detection signal of a power converter;
- clamping the reference signal at a threshold voltage if the reference signal equals or is greater than the threshold voltage; and
- generating a control signal to control a synchronous switch of the power converter in response to the detection signal and the reference signal.

10. The method as claimed in claim 9, further sampling and holding the detection signal for generating the reference signal.

11. The method as claimed in claim 10, further sampling and holding the detection signal to generate a hold signal for generating the reference signal in response to the hold signal and an amplifier coefficient.

12. The method as claimed in claim 10, further comprising:
- generating a first sample signal in accordance with a rising edge of the detection signal; and
- generating a second sample signal in accordance with a falling edge of the detection signal;
- wherein the first sample signal and the second sample signal are utilized to control the sampling and holding of the detection signal for generating the reference signal.

13. The method as claimed in claim 9, further comprising;
- comparing the detection signal with the reference signal to generating a switching signal; and
- generating the control signal in response to the switching signal.

14. The method as claimed in claim 9, wherein the detection signal is generated by present switching period of the power converter, and the reference signal is generated by sampling and holding the detection signal generated by previous switching period of the power converter.

15. The method as claimed in claim 9, wherein the detection signal is correlated to an input voltage of the power converter.

* * * * *